May 9, 1939.　　　　　G. ZUMFT　　　　　2,157,726
SPRAYER
Filed May 1, 1937
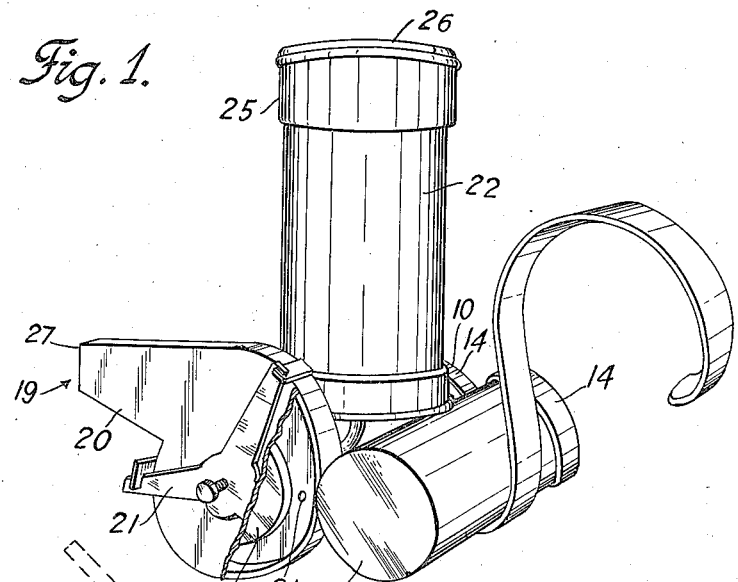
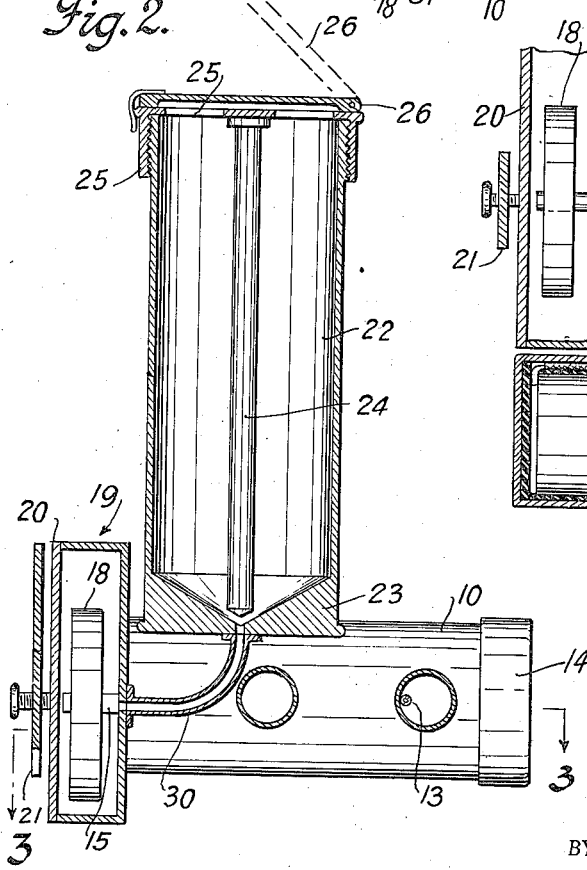
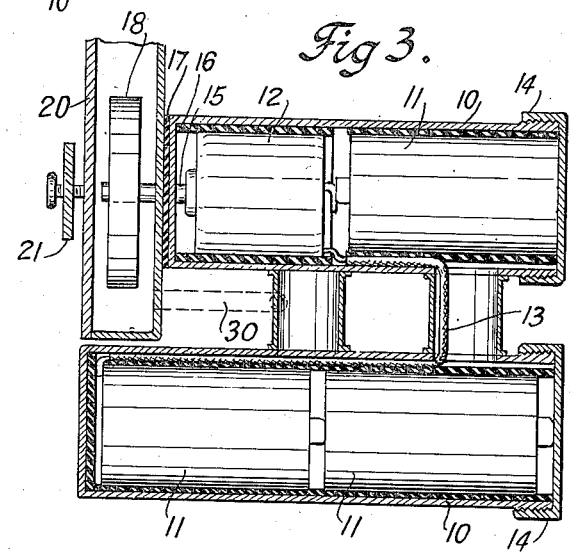
INVENTOR.
George Zumft
BY
ATTORNEY.

Patented May 9, 1939

2,157,726

UNITED STATES PATENT OFFICE 2,157,726

SPRAYER

George Zumft, New York, N. Y., assignor, by mesne assignments, to The Madison Products Company, New York, N. Y.

Application May 1, 1937, Serial No. 140,120

2 Claims. (Cl. 299—63)

This invention relates to a novel atomizer or sprayer of suitable materials, principally to be used for the disinfection of homes, for air-conditioning purposes, and for the destruction of pernicious insects or the like.

The sprayers now in common use for these purposes generally employ air under pressure for the dispensation of the material used, and are adapted to disperse certain materials only.

It is the primary object of this invention to provide an atomizer and sprayer, which operates automatically upon the closure of a battery circuit to actuate a dispensing wheel or disc of special construction which is fed with the disinfecting material from a suitable portable tank or the like, thus doing away with the necessity of using pumps or to connect the apparatus to the electric house circuit, etc.

Another object of the invention is the provision of an atomizer or sprayer of this type which is simple in its construction, and therefore comparatively inexpensive, and economical to operate, yet durable and highly efficient in practical use.

A further object of the invention is the provision of a portable atomizer or sprayer which is entirely self-contained and light, so that it may readily be transported from place to place where its use is desired, and the operation of which does not require special skill.

These and other objects of the invention will become more fully apparent as the description thereof proceeds, and will then be specifically defined in the appended claims.

In the accompanying drawing forming a material part of this disclosure:

Fig. 1 is a perspective view of the atomizer and sprayer constructed according to the invention with parts broken away for clearer illustration.

Fig. 2 is a side elevation of the apparatus with its tank and sprayer housing in section.

Fig. 3 is a section on line 3—3 of Figure 2.

As illustrated, the apparatus consists of two juxtaposed, substantially cylindrical casings 10 suitably connected with one another. One of these casings contains two dry cells 11, 11 and the other one dry cell 11, all cells being connected in series within the casing by means of the suitable cable 13. The tube or casing 10 containing one element 11 also contains a motor 12, the circuit for the operation of the motor is closed by the tightening of the outer cap 14 closing one end of the tube, while the loosening of the cap will break the circuit and make the motor inoperative.

The shaft 15 of the motor extends through the end wall 16 of the tube 10, which is preferably insulated, as at 17, and has suitably and removably attached thereto a housing 17 into which the shaft 15 of the motor extends. Within this housing 19, the shaft 15 carries a wheel or disc 18 of a special construction having its outer face provided with a plurality of blades or wings 18' adapted to disperse the material used in a fine spray or nebula to be expelled during the rapid rotation of the wheel 18 through the open mouth of the housing 19, preferably having the form of a nozzle 27. Motor housing 12 and shaft 15 are insulated from the remainder of the structure.

A clamp 21 having three arms preferably constructed as shown in Figure 1, secures the cover plate 20 of the housing 19 to the same.

The tank for the material to be dispensed is designated 22, and has a reinforced bottom 23 provided with a median needle opening with which co-operates the inner end of a needle valve 24 adjustable through the medium of the screw threaded connection of the cap 25 to the container 22, and a hinged cover 26 allows a filling of the tank after the removal of the screw cap 25.

In operation, after filling the tank with the disinfecting or other medium, and proper adjustment of the needle valve 24, the motor is started by tightening the cap 14 to close the battery circuit, and the wheel 18 will rapidly rotate. The disinfecting or other medium issued through the needle valve 28 will be guided through the pipe conduit 30 to the front or outer face of the wheel 18 and be dispersed by its wings or atomized so as to issue as a fine spray through nozzle 27.

It will be clear that after use the housing 20 can be readily removed from the casing 10 by the removal of the three-armed clamp 21 for cleaning, when the dispensing medium is changed.

It will only be necessary from time to time to renew the cells and the disinfecting medium and adjust the needle valve corresponding to the consistency of the medium in order to keep the apparatus in good working condition at all times.

It will be understood that only the preferred form of the invention has been described and shown as one example of the many possible ways to practically construct the same, and that such changes may be made in the general arrangement and the construction of the minor details thereof, as come within the scope of the appended claims without departure from the spirit of the invention and the principle involved.

Having thus described my invention, what I claim as new, and desire to secure by Letters Patent is:

1. In a sprayer of the class described, a pair of connected tubular containers forming a casing, two dry cells in one of said containers, and one dry cell and a motor in the other of said containers, a circuit in which said cells and the motor are located, caps on said tubular containers to close and open the circuit, a sprayer disc operated from said motor, a material tank on said casing, and connections between said tank and disc leading from the bottom of said tank through the inner wall of a housing for said disc attached to said casing and insulated therefrom, and a nozzle formed with said housing through which the spray from said disc is led to the atmosphere.

2. In a sprayer, an electrically operated sprayer disc, a tank for the material to be sprayed, connections between said tank and the sprayer disc to lead the material to the front face of said disc, a housing for said disc having a cover plate, a casing containing the source of electricity and a motor, and a three-armed clamp to removably attach said cover plate to the housing, said housing having a nozzle to disperse the material formed into a spray by said disc into the atmosphere.

GEORGE ZUMFT.